US012691704B2

(12) United States Patent (10) Patent No.: US 12,691,704 B2

Ramzan (45) Date of Patent: Jul. 28, 2026

(54) NON-SEALING FLUID-BASED WRITING INSTRUMENT AND NON-DRYING WRITING FLUID

(71) Applicant: Chaudhary M. Ramzan, Orange, CT (US)

(72) Inventor: Chaudhary M. Ramzan, Orange, CT (US)

( * ) Notice: Subject to any disclaimer, the term of this patent is extended or adjusted under 35 U.S.C. 154(b) by 0 days.

(21) Appl. No.: 18/984,242

(22) Filed: Dec. 17, 2024

(65) Prior Publication Data

US 2025/0196527 A1 Jun. 19, 2025

Related U.S. Application Data

(60) Provisional application No. 63/611,441, filed on Dec. 18, 2023.

(51) Int. Cl.
B43K 24/06 (2006.01)
B43K 24/08 (2006.01)
C09D 11/16 (2014.01)

(52) U.S. Cl.
CPC .............. B43K 24/06 (2013.01); B43K 24/08 (2013.01); C09D 11/16 (2013.01)

(58) Field of Classification Search
CPC ...... B43K 24/06; B43K 24/08; B43K 24/026; B43K 24/02; C09D 11/16; C09D 11/17; C09D 11/18; C09D 11/19; C09D 11/36; C09D 11/38
USPC ................................................. 401/116, 117
See application file for complete search history.

(56) References Cited

U.S. PATENT DOCUMENTS

| | | | | |
|---|---|---|---|---|
| 2,435,185 A | * | 1/1948 | Reynolds | B43K 7/005 |
| | | | | 401/117 |
| 2,941,511 A | * | 6/1960 | Cieremans | B43K 7/005 |
| | | | | 401/209 |
| 4,605,442 A | * | 8/1986 | Kawashita | C09B 43/16 |
| | | | | 106/31.48 |
| 5,131,776 A | * | 7/1992 | Mott | C09D 11/16 |
| | | | | 401/196 |
| 6,287,374 B1 | * | 9/2001 | Yanagida | C09D 11/324 |
| | | | | 106/478 |

(Continued)

OTHER PUBLICATIONS

International Search Report and Written Opinion mailed on Apr. 8, 2025, in connection with corresponding International Application No. PCT/US2024/060533; 15 pages.

*Primary Examiner* — David J Walczak

(74) *Attorney, Agent, or Firm* — McCormick, Paulding & Huber PLLC

(57) ABSTRACT

A non-sealing fluid-based writing instrument includes a body, a fluid reservoir, and a writing tip. The writing tip is fluidly connected to the fluid reservoir and configured to dispense fluid contained in the fluid reservoir on a surface when in use. The writing tip is concealed when the writing instrument is in a retracted position. The writing tip is exposed when the writing instrument is in an exposed position. The writing instrument is non-sealing. In both the retracted and exposed positions, the writing tip is exposed to the atmosphere or an exterior of the body of the writing instrument. A writing fluid for use in the non-sealing fluid-based writing instrument that includes one or more polyglycols. The polyglycol serves as a humectant that prevents the writing fluid from drying even when exposed to atmosphere for prolonged periods of time.

23 Claims, 3 Drawing Sheets

(56) References Cited

U.S. PATENT DOCUMENTS

| | | | |
|---|---|---|---|
| 7,775,734 B2 | 8/2010 | Dylkiewicz et al. | |
| 8,641,308 B2 * | 2/2014 | Peyton | ................... B43K 23/12 |
| | | | 401/116 |
| 2010/0186623 A1 | 7/2010 | Okabe et al. | |
| 2020/0269629 A1 | 8/2020 | Shih | |
| 2021/0016596 A1 | 1/2021 | Yu | |
| 2022/0161592 A1 | 5/2022 | Smith | |

* cited by examiner

NON-SEALING FLUID-BASED WRITING INSTRUMENT AND NON-DRYING WRITING FLUID

CROSS-REFERENCE TO RELATED APPLICATION

This application claims the benefit of U.S. Provisional Patent Application No. 63/611,441, filed Dec. 18, 2023, which is hereby incorporated by reference in its entirety.

TECHNICAL FIELD

The present disclosure relates generally to writing instruments and writing fluids and, more particularly, to non-sealing fluid-based writing instruments and non-drying writing fluids.

BACKGROUND

Fluid-based writing instruments are known. Known fluid-based writing instruments have some mechanism or structure for sealing the fluid reservoir and/or a writing tip of the writing instrument when not in use. For example, the writing instrument can have a cap that secures the body of the writing instrument to seal the fluid reservoir and/or the writing tip to prevent or minimize evaporation of the fluid or solvent(s) in the fluid reservoir. However, a cap that detaches from the writing instrument is often misplaced or lost, making it difficult or impossible to seal the tip or fluid reservoir again.

Besides a cap, other sealing mechanisms are known and used for sealing fluid-based writing instruments. For example, a retractable fluid-based writing instrument can have a sealing mechanism that seals the fluid reservoir and/or the writing tip of the instrument. Such a sealing mechanism is shown in U.S. Pat. No. 7,775,734, entitled "Seal assembly for the retractable instrument." The writing instrument disclosed in U.S. Pat. No. 7,775,734 includes a seal assembly 32 for sealing the writing instrument when in a retracted position, as shown in FIG. 5 of U.S. Pat. No. 7,775,734.

Another known sealing mechanism is a rolling mechanism of a ballpoint pen or roller ball writing instrument. The rolling ball of these writing instruments seals the fluid reservoir from the air but also serves as an applicator function when applied to a surface and dragged by a user.

In the past, there has been an attempt to produce a non-drying highlighter ink composed of a combination of solvents, including diethylene glycol, propylene glycol, and methyl pyrrolidone. Notably, methyl pyrrolidone was a critical solvent that negatively impacted the performance of the writing fluid (or ink, highlighter solution, etc.), leading to excessive ink penetration through the paper when used for highlighting text. Consequently, this product has not been successful or commercially launched. This formulation was only acceptable for highlighters. The humectant solvent blend used for highlighter was unacceptable for children's markers.

These solvents are now understood to be unacceptable for such writing applications because they are classified as toxic due to the presence of ethylene glycols in diethylene glycol and propylene glycol.

SUMMARY

The inventor of the present inventions has developed a range of highlighters, watercolor markers for children, and marker inks utilizing non-toxic solvents free of ethylene glycol. These writing fluids include non-drying, water-based ink explicitly designed for cap-less writing instruments, such as highlighters or markers, thereby enhancing consumer safety and usability while also addressing contemporary environmental standards.

Sealing mechanisms for fluid-based writing instruments have multiple parts, which add to the cost and complexity of manufacturing such writing instruments. It is an objective of the present disclosure to provide a simple and inexpensive non-sealing fluid-based writing instrument that utilizes a non-drying writing fluid.

According to the principles of the present disclosure, a writing instrument includes a body, a movable element, a fluid reservoir, a fluid chamber, a writing tip, and an opening. The body is cylinder-shaped and hollow. The body houses the fluid reservoir, the fluid chamber, and the writing tip. The body and the movable element are connected at one end of the body. The movable element is movably connected to the body. When in operation, the writing tip disposes fluid or ink onto a surface.

According to some principles of the present disclosure, a writing instrument includes a body, a movable element, a writing tip, and an opening. The writing instrument is configured to be actuated from a retracted position to an exposed position by pushing the movable element toward the body. The movable element includes an engagement feature and the body includes a latch receiver. When the movable element is actuated towards the exposed position, the engagement feature connects with the latch receiver and the writing instrument is placed in the exposed position. When the writing instrument is no longer in use, the movable element is configured to be actuated so that the engagement feature disengages from the latch receiver. This returns the writing instrument to the retracted position.

According to the principles of the present disclosure, a writing instrument includes a body with a groove and a movable element with a thread. The body further includes a writing tip. The body and the movable element are configured to connect through the mating of the groove and the thread. The groove and the thread are configured to interact in order to expose and/or conceal the writing tip as the thread of the movable element is rotated or pushed/slid on the groove of the body.

According to the principles of the present disclosure, a writing instrument includes a body, a writing tip, and a retractable plunge. The retractable plunge is configured to actuate the writing tip and/or a fluid reservoir such that the writing instrument is in an exposed position or a retracted position.

According to principles of the present disclosure, a writing fluid for a writing instrument includes one or more polyethylene glycol and a color dye. The polyethylene glycol(s) serve as a humectant that prevents the writing fluid in the writing instrument from drying, or at least greatly reduces the evaporation rate of fluid in the writing fluid so that a writing instrument having the writing fluid can be used as intended even if the writing fluid is not sealed from atmosphere or an exterior of the writing instrument for prolonged periods of time.

The writing fluid may further include one or more surfactants, which advantageously allow the writing fluid to be used in whiteboard marker applications. The surfactant(s) allow the writing fluid to be easily removed from a whiteboard surface with a damp cloth or other erasing material. In addition, the surfactant(s) will promote wettability of the whiteboard surface.

DETAILED DESCRIPTION

Figure 1A:
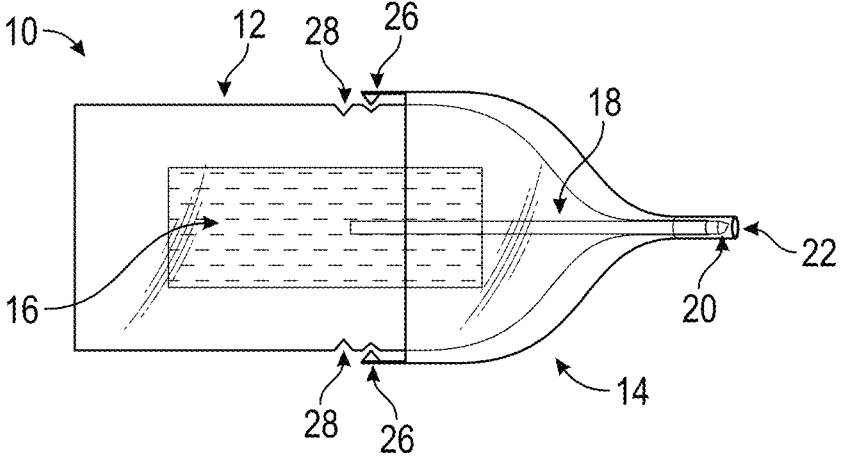
FIG. 1A is side view of a writing instrument in a retracted position according to the present disclosure.
Figure 1B:
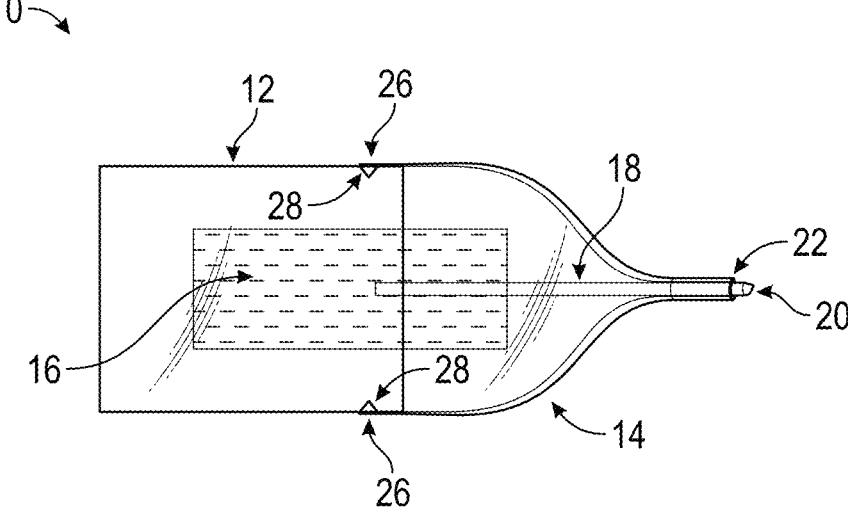
FIG. 1B is side view of a writing instrument of FIG. 1A in an exposed position.

Referring to FIGS. 1A and 1B, a writing instrument 10, according to the present disclosure, includes a body 12, a movable element 14, a fluid reservoir 16, a chamber 18, a writing tip 20, and an opening 22. The body 12 is cylinder-shaped and hollow, thereby defining the chamber 18. However, other body shapes and configurations are within the scope of the present disclosure. The body 12 houses the fluid reservoir 16 and, in some embodiments, the writing tip 20. The body 12 and the movable element 14 are connected at one end of the body 12. The movable element 14 is movably connected to the body 12. The writing tip 20 is configured to dispense fluid from the fluid reservoir 16 onto a surface when in use by a user.

The chamber 18 extends from the fluid reservoir 16 to the writing tip 20. The fluid reservoir 16 and the writing tip 20 are fluidly connected to each other. The fluid reservoir 16 includes a fluid (or combination of fluids and/or solvents and/or inks) that passes through the writing tip 20 when in use.

As shown in FIG. 1A, when the writing instrument 10 is in the retracted position, the writing tip 20 is concealed inside the body 12 and/or the movable element 14. In the retracted position, the writing tip 20 and/or the fluid reservoir 16 is exposed to the atmosphere and the exterior of the writing instrument 10.

As shown in FIG. 1B, when the writing instrument 10 is in the exposed position, the writing tip 20 extends through the opening 22. In this position, the writing tip 20 is exposed to the atmosphere and/or the exterior of the writing instrument 10.

The movable element 14 defines the opening 22. The opening 22 is circular but any opening 22 shape is within the scope of the present disclosure. The size and shape of the opening 22 is dimensioned to allow the writing tip 20 to extend through the opening 22 when the writing instrument is actuated to the exposed position. The opening 22 is at a terminal end of the movable element 14.

The writing instrument 10 is configured to be actuated from the retracted position to the exposed position by actuating the movable element 14 in a first direction. The movable element 14 includes an engagement feature 26 and the body 12 includes a latch receiver 28. When the movable element 14 is actuated in the first direction, the engagement feature 26 connects with the latch receiver 28. This reveals the writing tip 20 by putting the writing instrument 10 in the exposed position. The engagement feature 26 and latch receiver 28 are configured to maintain the writing instrument 10 in this exposed position while the writing instrument 10 is in use. Any latching or retaining mechanism is within the scope of the present disclosure. In some embodiments, there may be more than one latch receiver 28 and the different latch receivers 28 may be defined along a longitudinal length of the writing instrument and have different depths (as shown in FIG. 1A; only one latch receiver 28 is shown in FIG. 1B).

When the writing instrument 10 is no longer desired to be in use, the movable element 14 is configured to be actuated in a second direction, the second direction being opposite to the first direction, which disconnects the engagement feature 26 and the latch receiver 28. This returning the writing instrument 10 to the retracted position.

During the transition between the retracted and exposed position, the writing tip 20 is always exposed to the atmosphere and the exterior of the writing instrument 10.

Figure 2A:
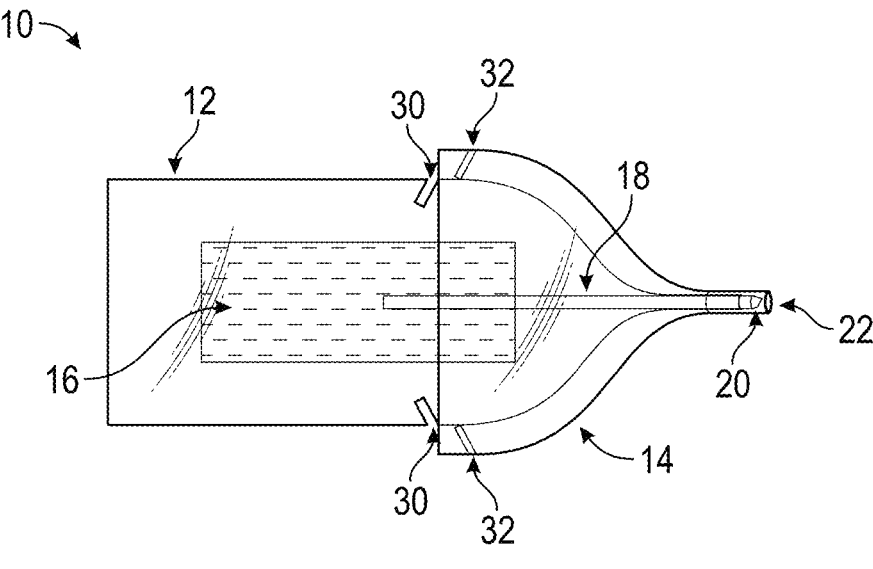
FIG. 2A is side view of a writing instrument in a retracted position according to the present disclosure.
Figure 2B:
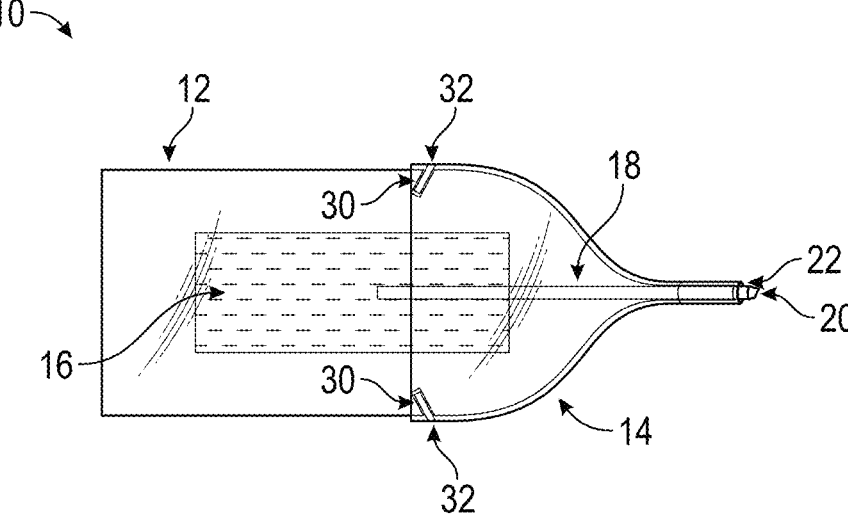
FIG. 2B is side view of a writing instrument of FIG. 2A in an exposed position.

Referring to FIGS. 2A and 2B, the body 12 includes or defines a groove 30 and the movable element 14 includes or defines a thread 32 (in other embodiments the body 12 includes or defines the thread 32 and the movable element includes or defines the groove 30). The body 12 and movable element 14 are configured to connect through the mating of the groove 30 and the thread 32. The groove 30 and the thread 32 are configured to interact through twisting by a user in order to expose and/or conceal the writing tip 20 as the thread 32 of the movable element 14 rotates within the groove 30 of the body 12.

In some embodiments, the writing instrument 10 is configured to be actuated from the retracted position to the exposed position by aligning the groove 30 and the thread 32 and twisting the thread 32 along the groove 30. As the movable element 14 rotates the thread 32 of the movable element 14 along the groove 30, the writing tip 20 becomes more exposed or concealed depending on the direction of rotation.

In the exposed position, the movable element 14 is configured to be rotated in the opposite direction to return the writing instrument 10 to its retracted position. In some embodiments, the writing tip 20 extends the farthest possible through the opening 22.

According to some embodiments, the body 12 can comprise a plurality of grooves and the movable element can comprise a plurality of threads that are configured to mate with the plurality of grooves.

Figure 3A:
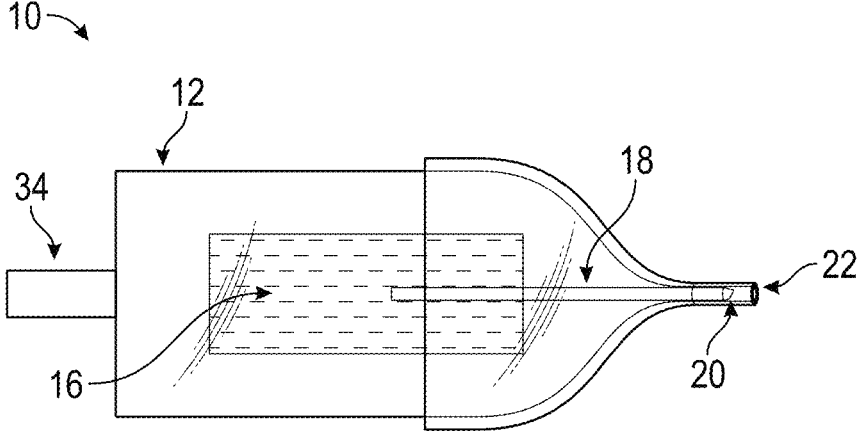
FIG. 3A is side view of a writing instrument in a retracted position according to the present disclosure.
Figure 3B:
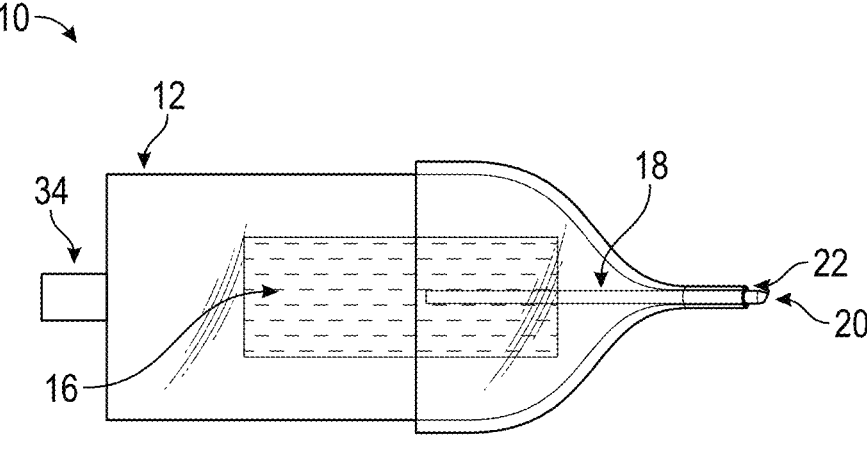
FIG. 3B is side view of a writing instrument of FIG. 3A in an exposed position.

Referring to FIGS. 3A and 3B, body 12 of the marker features an open end designated for inserting a reservoir at the opposite end from tip 20. This opening will be secured by a button or a retractable plunge 34, consistent with the design of conventional markers. The retractable plunge 34 utilizes a thrust device and spring arrangement to actuate the writing instrument 10 from the retracted position to the exposed position or vice-versa. The retractable plunge 34 is configured to be actuated in a first direction to actuate the writing instrument 10 to an exposed position, and to be actuated in a second direction, opposite the first direction, to actuate the writing instrument 10 to return to the retracted position. In the retracted position, the writing tip 20 is concealed by the body 12 but is still exposed to the atmosphere or an exterior of the body 12. In the exposed position, the writing tip 20 extends through the opening 22 of the body 12 (in some embodiments the opening that the writing tip 20 extends through is defined by the body 12 and in some embodiments as discussed above the opening is defined by a movable element).

When the retractable plunge 34 is actuated while in the retracted position, the writing tip 20 is configured to move through and extend from the opening 22. When the retractable plunge 34 is actuated while in the exposed position, the writing tip 20 is configured to retract back into the body 12. In some embodiments, the fluid reservoir 16 is movable by the retractable plunge 34 as well, and the fluid reservoir 16 and writing tip 20 move synchronously.

According to some aspects, the body 12 further includes a clip. The clip is configured to attach to another surface, such as an article of clothing for convenient carrying of the writing instrument 10.

At least a portion of the writing tip 20 is always fluidly connected to an exterior of the body 12 when the writing tip is in the retracted position and the exposed position.

The fluid in the fluid reservoir of the writing instruments of the present disclosure may be virtually any type of fluid or solvent-based composition. For example, the fluid may be water-based, oil-based, solvent-based, or any combination thereof.

In some embodiments, the fluid includes polyethylene glycol (or "PEG") to prevent drying of the fluid in the fluid reservoir while left unsealed in the environment. For example, a highlighter writing instrument having fluorescent yellow ink fluid may have the following compositions ("comp. #") according to the present disclosure where materials are listed in the table by weight percentage:

| | Highlighter Fluorescent Yellow Ink | | | | | |
| Material Description | Comp. 1 | Comp. 2 | Comp. 3 | Comp. 4 | Comp. 5 | Comp. 6 |
| --- | --- | --- | --- | --- | --- | --- |
| Polyethylene Glycol 400 | 45.000 | 45.000 | 40.000 | 40.000 | 0.000 | 0.000 |
| Polyethylene Glycol 200 | 0.000 | 0.000 | 0.000 | 0.000 | 45.000 | 45.000 |
| Glycerin | 0.500 | 0.000 | 0.500 | 0.000 | 0.500 | 0.000 |
| Sorbitol 70% | 1.500 | 0.000 | 1.500 | 0.000 | 1.500 | 0.000 |
| Methyl Paraben | 0.025 | 0.025 | 0.025 | 0.025 | 0.025 | 0.025 |
| Ethyl Paraben | 0.025 | 0.025 | 0.025 | 0.025 | 0.025 | 0.025 |
| Basic Yellow 40 | 1.500 | 1.500 | 1.500 | 1.500 | 1.500 | 1.500 |
| Water | 51.450 | 53.450 | 56.450 | 58.450 | 51.450 | 53.450 |
| Total | 100.000 | 100.000 | 100.000 | 100.000 | 100.000 | 100.000 |

In some embodiments, the fluid may include tri-ethylene glycol and/or polyethylene glycol 400. For example, a highlighter writing instrument having fluorescent yellow ink may have the following compositions where materials are listed in the table by weight percentage:

6

| | Highlighter Fluorescent Yellow Ink | | | |
| Material Description | Comp. 7 | Comp. 8 | Comp. 9 | Comp. 10 |
| --- | --- | --- | --- | --- |
| Polyethylene Glycol 400 | 35.000 | 35.000 | 22.000 | 22.000 |
| Tri ethylene Glycol | 15.000 | 15.000 | 33.000 | 33.000 |
| Glycerin | 0.500 | 0.000 | 0.500 | 0.000 |
| Sorbitol 70% | 1.500 | 0.000 | 1.500 | 0.000 |
| Methyl Paraben | 0.025 | 0.025 | 0.025 | 0.025 |
| Ethyl Paraben | 0.025 | 0.025 | 0.025 | 0.025 |
| Basic Yellow 40 | 1.500 | 1.500 | 1.500 | 1.500 |
| Water | 46.450 | 48.450 | 41.450 | 43.450 |
| Total | 100.000 | 100.000 | 100.000 | 100.000 |

While the above compositions are disclosed as being a yellow colored writing fluid (i.e. containing basic yellow 40), it is within the scope of the present disclosure for the non-drying writing fluids to be used with any color dye, i.e. as an alternative to basic yellow 40 and/or in combination with basic yellow 40. For example, the following is a table of compositions for writing fluids for different colors that are within the scope of the present disclosure where materials are listed in the table by weight percentage:

| | Color | | | | | | | | |
| Material description | Black Comp. 11 | Red Comp. 12 | Blue Comp. 13 | Yellow Comp. 14 | Orange Comp. 15 | Pink Comp. 16 | Magenta Comp. 17 | Green Comp. 18 | Turquoise Comp. 19 |
| --- | --- | --- | --- | --- | --- | --- | --- | --- | --- |
| PEG 400 | 38.00 | 38.00 | 38.00 | 38.00 | 38.00 | 38.00 | 38.00 | 38.00 | 38.00 |
| Tri Ethylene glycol | 7.00 | 7.00 | 7.00 | 7.00 | 7.00 | 7.00 | 7.00 | 7.00 | 7.00 |
| Methyl Paraben | 0.03 | 0.03 | 0.03 | 0.03 | 0.03 | 0.03 | 0.03 | 0.03 | 0.03 |
| Ethyl Paraben | 0.03 | 0.03 | 0.03 | 0.03 | 0.03 | 0.03 | 0.03 | 0.03 | 0.03 |
| Palmer Red KB | 0.00 | 4.30 | 0.00 | 0.00 | 0.00 | 2.50 | 2.50 | 0.00 | 0.00 |
| Palmer Patent Blue | 0.00 | 0.00 | 2.80 | 0.00 | 0.00 | 0.00 | 0.00 | 2.00 | 0.62 |
| Palmer Yellow B52 | 0.00 | 0.00 | 0.00 | 0.00 | 0.00 | 0.00 | 0.00 | 1.50 | 0.12 |
| Palmer Yellow R | 0.00 | 0.00 | 0.00 | 5.00 | 0.00 | 0.00 | 0.00 | 0.00 | 0.00 |
| Palmer Violet LS | 1.65 | 0.00 | 0.25 | 0.00 | 0.00 | 0.00 | 0.00 | 0.00 | 0.00 |
| Palmer Orange B113 | 0.85 | 0.70 | 0.00 | 0.00 | 3.70 | 0.00 | 0.00 | 0.00 | 0.00 |

-continued

| Material description | Color | | | | | | | | |
|---|---|---|---|---|---|---|---|---|---|
| | Black Comp. 11 | Red Comp. 12 | Blue Comp. 13 | Yellow Comp. 14 | Orange Comp. 15 | Pink Comp. 16 | Magenta Comp. 17 | Green Comp. 18 | Turquoise Comp. 19 |
| Palmer Magenta | 0.00 | 0.00 | 0.00 | 0.00 | 0.00 | 0.00 | 0.25 | 0.00 | 0.00 |
| Water | 52.45 | 49.95 | 51.90 | 49.95 | 51.25 | 52.45 | 52.20 | 51.45 | 54.21 |
| Total | 100.00 | 100.00 | 100.00 | 100.00 | 100.00 | 100.00 | 100.00 | 100.00 | 100.00 |

The compositions identified in the tables above should not be construed as limiting the invention to the merely the compositions disclosed. Changes and modifications to the weight percentages are within the scope of the present disclosure, as well as the removal of some of the materials identified and addition of other materials not listed. For example, different average molecular weight polyethylene glycol may be used instead of PEG 400. Polyglycols of various grades free of toxic solvents (e.g., ethylene glycol) can sometimes be used. In some embodiments, PEG 600 may be utilized. In some embodiments, non-drying writing fluids include some mixture of PEG average molecular weight 400 and higher.

Preferably, the PEG content of the non-drying writing fluid is 50% by weight or less. The inventor has found that solutions having PEG content greater than 50% by weight may have adverse effects on the writing fluid, such as the viscosity increasing to an undesirable level.

When the writing fluid is used for whiteboard surface applications, one or more surfactants (e.g. nonionic or anionic surfactants) may be included in the writing fluid to ensure proper wetting of the writing fluid onto the whiteboard surface (e.g. a Formica® surface). The following is a list of non-exhaustive exemplary surfactants that provide good wetting properties and may be included in the writing fluid:

1,3-bis [(12-hydroxyoctadec-9-enoyl)oxy]propan-2-yl 12-hydroxyoctadec-9-enoate;

Atlas-G-1049: Polyoxyethylene Sorbitol Septa-isostearate (ICI);

Tween 80: Polyoxyethylene sorbitan monooleate (ICI);

Arlaolve 200: Polyoxyethylene (20) isohexadecylether (ICI);

Atlas G-1441, Polyethylene (40) sorbitollanolinderivitive (ICI);

Polyoxyethylene sorbitan monostearate (ICI);

Atsurf™ T-80: Polyoxyethylene Sorbitan monooleate (ICI);

Ethoxylate of castor oil (polyethylene glycol chain containing approximately 20-60 ethylene oxide units); and Cirrasol ALN-WF: Polyoxyethylene fatty alcohol (ICI).

Any one or more of the surfactants may be included in a writing fluid of the present disclosure to improve wetting properties on a whiteboard or other surface. Any surfactants, dispersants, and emulsifiers preferably have HLB values between 7-15, but other values are within the scope of the present disclosure. Preferably, a writing fluid for use on a whiteboard has a viscosity of 8-15 cps at 25° C. and has a surface tension of less than 37 Dynes/cm at 25° C.

Acid, basic, direct, dispersed, and reactive dyes are effective for formulating water-based whiteboard marker inks. Certain solvent dyes, which exhibit partial solubility, can also be utilized in these inks. Acid dyes, direct dyes, and basic dyes are particularly well-suited for the production of water-based whiteboard marker inks due to their compatibility and performance characteristics within this medium.

The following is a table of compositions for writing fluids for whiteboard applications having black color according to the present disclosure where materials are listed in the table by weight percentage:

| | Whiteboard Marker Black Ink | | | | | | |
|---|---|---|---|---|---|---|---|
| | Comp. 20 | Comp. 21 | Comp. 22 | Comp. 23 | Comp. 24 | Comp. 25 | Comp. 26 |
| Polyethylene Glycol 400 | 40.000 | 40.000 | 40.000 | 40.000 | 40.000 | 40.000 | 40.000 |
| Water | 29.700 | 29.700 | 29.700 | 29.700 | 29.700 | 29.700 | 29.700 |
| Methyl Para sept | 0.025 | 0.025 | 0.025 | 0.025 | 0.025 | 0.025 | 0.025 |
| Ethyl Para sept | 0.025 | 0.025 | 0.025 | 0.025 | 0.025 | 0.025 | 0.025 |
| Atlas-G-1049: | 0.250 | 0.000 | 0.000 | 0.000 | 0.000 | 0.000 | 0.000 |
| Ethoxylate of castor oil | 0.000 | 0.000 | 0.000 | 0.000 | 0.000 | 0.000 | 0.000 |
| Atlas G-1441 | 0.000 | 0.250 | 0.000 | 0.000 | 0.000 | 0.000 | 0.000 |
| Arlaolve 200 | 0.000 | 0.000 | 0.250 | 0.000 | 0.000 | 0.000 | 0.000 |
| Atsurf T-80 | 0.000 | 0.000 | 0.000 | 0.250 | 0.250 | 0.250 | 0.250 |
| Cirrasol ALN-WF | 0.000 | 0.000 | 0.000 | 0.000 | 0.000 | 0.000 | 0.000 |
| Pontamine Black SP Liquid (Direct Black SP) | 30.000 | 30.000 | 30.000 | 30.000 | 30.000 | 30.000 | 30.000 |
| Total | 100.000 | 100.000 | 100.000 | 100.000 | 100.000 | 100.000 | 100.000 |

The following is a table of additional compositions for writing fluids for whiteboard applications having black color according to the present disclosure where materials are listed in the table by weight percentage:

| Material Description | Whiteboard Marker Black Ink | | | |
| --- | --- | --- | --- | --- |
| | Comp. 27 | Comp. 28 | Comp. 29 | Comp. 30 |
| Polyethylene Glycol 400 | 20.000 | 20.000 | 20.000 | 40.000 |
| Tri ethylene Glycol | 30.000 | 25.000 | 10.000 | 0.000 |
| Propylene glycol | 0.000 | 0.000 | 10.000 | 0.000 |
| Water | 19.450 | 24.450 | 29.450 | 29.450 |
| Methyl Para sept | 0.025 | 0.025 | 0.025 | 0.025 |
| Ethyl Para sept | 0.025 | 0.025 | 0.025 | 0.025 |
| Polyethylene glycol chain containing approximately 20-60 ethylene oxide units | 0.250 | 0.250 | 0.250 | 0.250 |
| Ethoxylate of castor oil | 0.250 | 0.250 | 0.250 | 0.250 |
| Pontamine Black SP Liquid (Direct Black SP) | 30.000 | 30.000 | 30.000 | 30.000 |
| Total | 100.000 | 100.000 | 100.000 | 100.000 |

Acid, basic, direct, disperse and reactive dyes serve as effective constituents in the formulation of water-based whiteboard marker inks. Furthermore, certain solvent dyes with partial solubility may also be incorporated into these formulations. Notably, acid dyes, direct dyes, and basic dyes are especially advantageous for producing water-based whiteboard marker inks, owing to their compatibility and favorable performance characteristics within this application. This dye selection enhances the markers' overall functionality and usability, ensuring optimal results in educational and professional environments.

While the above compositions are disclosed as being for a writing instrument having black colored writing fluid for use in whiteboard applications, it is within the scope of the present disclosure for the non-drying writing fluids to be used with whiteboard applications have any coloring dye, i.e. as an alternative to black color dye and/or in combination with black color dye. For example, the following is a table of compositions for writing fluids for whiteboard applications having different color dyes that are within the scope of the present disclosure where materials are listed in the table by weight percentage:

| Material Description | Whiteboard Marker Ink | | | |
| --- | --- | --- | --- | --- |
| | Black Comp. 31 | Blue Comp. 32 | Red Comp. 33 | Green Comp. 34 |
| Polyethylene Glycol 400 | 20.000 | 20.000 | 20.000 | 20.000 |
| Tri ethylene Glycol | 30.000 | 30.000 | 30.000 | 30.000 |
| Water | 19.450 | 27.450 | 42.450 | 9.450 |
| Methyl Para sept | 0.025 | 0.025 | 0.025 | 0.025 |
| Ethyl Para sept | 0.025 | 0.025 | 0.025 | 0.025 |
| Polyethylene glycol chain containing approximately 20-60 ethylene oxide units | 0.250 | 0.250 | 0.250 | 0.250 |
| Ethoxylate of castor oil | 0.250 | 0.250 | 0.250 | 0.250 |
| Pontamine Black SP Liquid (Direct Black SP) | 30.000 | 0.000 | 0.000 | 0.000 |
| Pontamine Blue 86 Liquid (Direct Blue 86) | 0.000 | 20.000 | 0.000 | 20.000 |

-continued

| Material Description | Whiteboard Marker Ink | | | |
| --- | --- | --- | --- | --- |
| | Black Comp. 31 | Blue Comp. 32 | Red Comp. 33 | Green Comp. 34 |
| Acid Violet 17 Powder | 0.000 | 2.000 | 0.000 | 0.000 |
| Direct Red 254 Liquid (20%) | 0.000 | 0.000 | 2.000 | 0.000 |
| Acid Yellow 23 Liquid (30%) | 0.000 | 0.000 | 3.000 | 20.000 |
| Acid Red 87 Powder | 0.000 | 0.000 | 2.000 | 0.000 |
| Total | 100.000 | 100.000 | 100.000 | 100.000 |

The inventor of the present inventions has become acutely aware of several limitations associated with conventional writing tools. Wax crayons are consistently produced with muted colors and are susceptible to breakage, diminishing their effectiveness. Water-based markers often suffer issues with their caps being lost or misplaced, leading to instances where the water-based markers dried out and become unusable. This problem is not confined to standard markers. Rather, it extends to highlighters and children watercolor markers, all containing water, humectants, and dyes, components that can rapidly desiccate when left uncapped/exposed to environment.

Several leading manufacturers have introduced retractable, cap-free markers to address these prevalent challenges. However, producing these sophisticated designs poses considerable manufacturing challenges and expenses, requiring advanced mechanisms to prevent the loss of ink solvent, which is critical in avoiding marker drying.

Advantageously, the non-sealing fluid-based writing instruments of the present disclosure do not require a cap or other sealing mechanism for sealing the writing tip and/or fluid reservoir from the atmosphere or an exterior of the body of the writing instrument.

While the writing fluids of the present disclosure have been described as being "non-drying," this description should not be taken literally in the sense that the fluids do not demonstrate any drying behavior. Rather, "non-drying" in the context of the present disclosure should be understood to mean that the rate of water or fluid evaporation in the writing fluid when exposed to atmosphere is low enough that the writing instrument can operate as intended, even when unsealed from the environment, long enough to exhaust all or the majority of the fluid in the writing instrument for the product to be useful before rendered inoperable. For example, writing instruments having fluid according to the writing fluids disclosed in the present disclosure can be exposed to atmosphere for months or years while still being operable to write on surfaces.

The writing fluids for the "cap-free" writing utensils of the present disclosure (the writing utensils may have caps, but not necessary to prevent drying of the writing fluid) advantageously have a unique humectant that is non-toxic and does not penetrate (or bleed through) paper to such a degree as to be undesirable. The inventions' inventor tested writing fluids with polyethylene glycol alone or in combination with other non-toxic humectants. Results were similar to those of the capped marker when stored in a 60° C. oven for six and eight weeks and worked well after this heating period. These results suggest that the writing fluids of the present disclosure may function when exposed to atmosphere at room temperature for potentially two years or more, depending on storage conditions. However, the useful life of writing fluids of the present disclosure may be shorter or longer than this time frame.

The innovative writing instruments and writing fluids of the present disclosure represent a significant advancement in marker/highlighter design and distinguished by the lack of need for a cap or other sealing mechanism for the writing fluid. The cap-free marker/highlighter design solves the problem of misplaced caps and the resulting issue of ink drying out in the marker/highlighter. By removing the need for a cap, the inventions of the present disclosure mitigate the problems addressed in the field and enhance the overall user experience, making these inventions a valuable improvement in the field of educational tools among other fields.

The writing fluids of the present disclosure have advantages over conventional whiteboard marker ink fluids that include pigments. Pigments require sophisticated grinding and dispersing technologies and volatile solvents such as ethyl and isopropyl alcohol. Pigment-based inks face additional complexities in maintaining uniform dispersion within the fluid reservoir. Since pigments do not dissolve in the solvent, but remain dispersed, they are prone to settling, compromising the marker's ability to provide a consistent writing experience. Moreover, solvent evaporation can occur if the conventional marker cap is not adequately secured, further diminishing the ink (writing fluid) performance. Extended exposure to air significantly accelerates the drying process when the cap is removed. As a result, the shelf life of a conventional whiteboard marker is often limited. The writing fluids of the present disclosure are superior than conventional pigment-based solutions dispersed in alcohol.

The writing fluids of the present disclosure advantageously are color dye based and water-based, non-drying writing fluids that may be used in non-sealing writing instruments. In some embodiments, the writing fluids may be free from volatile solvents and/or free from pigment/pigment dust. The innovative solutions of the present disclosure enhances the user experience by allowing effortless removal from whiteboard surfaces with a damp cloth or tissue and significantly simplifies the overall cleaning process.

The present disclosure provides innovative solutions: a water-based formulation utilizing dyes as colorants. This approach mitigates the risk associated with the volatile, flammable solvents traditionally used, which pose substantial safety concerns during manufacturing. The shift from pigment-based inks to water-based fluids eliminates the need for explosion-proof processing equipment and specialized mills for grinding and dispersion, thereby reducing capital expenditure and enhancing manufacturing safety.

The cap-free marker writing fluid of the present disclosure includes a superior humectant that will not undesirably permeate through the paper when writing on paper and will not lose moisture with prolonged exposure to the atmosphere. The writing fluids are advantageously non-toxic, a requirement for many school applications with engagement by school children. One or more polyglycols are the solvent as a humectant in some embodiments. The molecular weight of the polyglycerol(s) used can be configured to achieve the desired viscosity for the particular application. Preferably, a polyethylene glycol forming less than 50% weight of the writing fluid provides a favorable viscosity value for many writing applications. In some embodiments, the writing fluid includes a biocide and/or a fungicide.

As will be recognized by those of skill in the art, numerous changes and modifications may be made to the above-described disclosure without departing from the spirit or scope thereof. Accordingly, the particular embodiments described in this specification are to be taken as merely illustrative and not limiting.

What is claimed is:

1. A writing instrument comprising:
a body;
a fluid reservoir arranged within the body, the fluid reservoir containing a fluid; and
a writing tip fluidly connected to the fluid reservoir;
wherein the writing instrument is configured to actuate from a retracted position to an exposed position and to actuate from the exposed position to the retracted position;
wherein the writing tip is concealed when the writing instrument is in the retracted position;
wherein the writing tip is exposed when the writing instrument is in the exposed position;
wherein the fluid reservoir and the writing tip are not sealed from an atmosphere or an exterior of the body when the writing instrument is in the retracted position; and
wherein the fluid reservoir and the writing tip are not sealed from the atmosphere or the exterior of the body when the writing instrument is in the exposed position.

2. The writing instrument, according to claim 1, wherein the fluid is water-based.

3. The writing instrument, according to claim 1, wherein the fluid is solvent-based.

4. The writing instrument, according to claim 1, wherein the fluid is oil-based.

5. The writing instrument, according to claim 1, further comprises a movable element, wherein the movable element is configured to be actuated from a first position to a second position and actuated from the second position to the first position, wherein the writing instrument is in the retracted position when the movable element is in the first position, and wherein the writing instrument is in the exposed position when the movable element is in the second position.

6. The writing instrument, according to claim 5, wherein the movable element defines an opening, wherein the writing tip does not extend through the opening when the writing instrument is in the retracted position, and wherein the writing tip extends through the opening when the writing instrument is in the exposed position.

7. The writing instrument, according to claim 5, wherein the movable element comprises an engagement feature and the body comprises a latch receiver, and wherein the engagement feature is configured to engage the latch receiver when the writing instrument is in the exposed position.

8. A writing instrument comprising:
a body;
a fluid reservoir arranged within the body, the fluid reservoir containing a fluid; and
a writing tip fluidly connected to the fluid reservoir;
wherein the writing instrument is configured to actuate from a retracted position to an exposed position and to actuate from the exposed position to the retracted position;
wherein the writing tip is concealed when the writing instrument is in the retracted position;
wherein the writing tip is exposed when the writing instrument is in the exposed position; and
wherein the fluid reservoir and the writing tip are always fluidly connected to an atmosphere or an exterior of the body.

9. The writing instrument according to claim 8, wherein the fluid is water-based.

10. The writing instrument according to claim 8, further comprises a movable element, the movable element defining or including a thread, wherein the body defines a groove and wherein the thread of the movable element interacts with the groove of the body.

11. The writing instrument, according to claim 10, wherein the groove and the thread are configured to connect the body and the movable element.

12. The writing instrument according to claim 11, wherein the movable element is configured to be twisted to connect the groove and the thread.

13. The writing instrument according to claim 8, wherein the fluid is solvent-based.

14. The writing instrument according to claim 8, wherein the fluid is oil-based.

15. A writing fluid for use in a writing instrument, the writing fluid comprising:

a polyethylene glycol; and a color dye;

wherein the polyethylene glycol comprises 20% or more by weight of the writing fluid.

16. The writing fluid according to claim 15, wherein the polyethylene glycol is polyethylene glycol 400.

17. The writing fluid according to claim 15, wherein the polyethylene glycol makes up less than 50% weight of the writing fluid.

18. The writing fluid according to claim 15, further comprising a biocide and a fungicide.

19. The writing fluid according to claim 15, further comprising a surfactant.

20. A writing instrument comprising the writing fluid according to claim 15.

21. The writing fluid according to claim 15, wherein the polyethylene glycol comprises less than 50% by weight of the writing fluid.

22. A writing fluid for use in a writing instrument, the writing fluid comprising:

a polyethylene glycol; and a color dye;

further comprising glycols, glycerin, and polyglycols, and wherein the writing fluid does not contain ethylene glycol.

23. A writing instrument comprising:

a body;

a fluid reservoir arranged within the body, the fluid reservoir containing a fluid; and a writing tip fluidly connected to the fluid reservoir;

wherein the writing instrument is configured to actuate from a retracted position to an exposed position and to actuate from the exposed position to the retracted position;

wherein the writing tip is concealed when the writing instrument is in the retracted position;

wherein the writing tip is exposed when the writing instrument is in the exposed position;

wherein the fluid reservoir and the writing tip are not sealed from an atmosphere or an exterior of the body when the writing instrument is in the retracted position; and wherein the fluid reservoir and the writing tip are not sealed from the atmosphere or the exterior of the body when the writing instrument is in the exposed position, wherein the fluid is a writing fluid comprising:

a polyethylene glycol; and a color dye.

* * * * *